(12) United States Patent
Tsai

(10) Patent No.: US 6,212,852 B1
(45) Date of Patent: Apr. 10, 2001

(54) EVACUATED GLAZING CONTAINING A THERMALLY INSULATING VACUUM

(75) Inventor: Chun-Hui Tsai, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/268,864

(22) Filed: Mar. 15, 1999

(51) Int. Cl.$^7$ .................................................. A47G 1/00
(52) U.S. Cl. .................... 52/786.13; 428/34; 156/107; 156/109
(58) Field of Search .................... 52/171.3, 172, 52/786.1, 786.13; 428/34; 156/99, 104, 107, 109

(56) References Cited

U.S. PATENT DOCUMENTS

| | | | |
|---|---|---|---|
| 4,928,448 | * 5/1990 | Phillip | 52/174 |
| 5,252,408 | * 10/1993 | Bridges | 52/791 |
| 5,489,321 | * 2/1996 | Tracy | 156/99 |
| 5,643,644 | * 7/1997 | Demars | 52/786.1 |
| 5,657,607 | 8/1997 | Collins et al. . | |
| 5,668,353 | * 9/1997 | Matsuda | 178/18 |
| 5,794,403 | * 9/1998 | Oberlander | 52/786.11 |
| 5,794,404 | * 8/1998 | Kim | 52/786.13 |
| 5,989,659 | * 11/1999 | Kato | 52/786.13 |
| 6,071,575 | * 6/2000 | Collins | 52/786.1 |
| 6,083,578 | * 7/2000 | Collins | 52/786.1 |

* cited by examiner

*Primary Examiner*—Beth A. Stephan

(57) ABSTRACT

A thermally insulating evacuated glass panel comprises two spaced apart glass sheets separated and bonded by a mesh-like supporting structure. The mesh-like supporting structure is formed by a plurality of elongated spacers arranged in orthogonal directions for enclosing a plurality of small evacuated spaces. The elongated spacer contains a mixture of a glass sealing material and a number of glass spheres. The evacuated spaces provide efficient insulation for the glass panel. The glass panel can be cut into smaller pieces of desired size and shape without losing its insulating property.

13 Claims, 5 Drawing Sheets

EVACUATED GLAZING CONTAINING A THERMALLY INSULATING VACUUM

FIELD OF THE INVENTION

The present invention relates generally to thermally insulating glass, and more particularly to glass panels containing a thermally insulating vacuum.

BACKGROUND OF THE INVENTION

There are many types of thermally insulating glass panels. Some of them are made by coating multiple transparent and dielectric layers on glass and some are made by enclosing insulating gaps between multiple glass panels. Basically, two glass sheets separated by a vacuum space gap can greatly increase the thermally insulating effect of the glass panel.

In manufacturing glass panels having insulating gaps, three to five layers of glass are usually required to provide good insulating effect. Conventionally, getter is put into the gap between glass panels that are framed and sealed by metal. A vacuum space having air pressure below atmosphere pressure is thus formed between glass panels by the getter. Dried gas such as $N_2$ is a suitable material for the getter because the thermal expansion coefficient of dried $N_2$ is fairly small.

A schematic diagram of a conventional evacuated glass panel is shown in FIG. 1. To manufacture an evacuated glass panel, two flat glass sheets 101 and 102 are separated by a narrow evacuated space and hermetically sealed around the edge 103. An array of support pillars 104 maintains the separation of the two glass sheets 101 glass sheet with solder glass that is used to make the edge seal between the glass sheets 101 and 102. Evacuation takes place through the tube. The glass panel 100 thus contains a thermally insulating vacuum.

There are various evacuation methods. For example, a tube 107 may pass through a hole extending in the glass panel between the space 106 and the exterior of the glass panel. Alternatively, the tube 107 may be sealed to a hole passing from an interior face of one sheet of glass to an exterior face. FIG. 2 illustrates a sectional view of the glass panel shown in FIG. 1. As shown in FIG. 2, a small tube 107 is positioned at a corner of the glass panel 100 and sealed into one glass sheet 102 with solder glass 108. The apex of the corner is removed to accommodate the stub 105 of the tube 107. This ensures that it does not protrude beyond the nominal dimension of the glass panel 100.

The thermally insulating vacuum technique as shown in FIGS. 1 and 2 has some disadvantages. One is that customers must provide manufacturers with the specification of a glass panel in advance. In other words, users can not control by themselves the shape or size of a glass panel once the glass panel has been manufactured. Another problem is that the thermally insulating effect of such glass panels is not good enough in an environment such as a low temperature area. Even if two or three layers of such glass panels including dried $N_2$ are used, the thermally insulating effect is still poor in the building located at low temperature areas.

One application of conventional heat insulating glass panels is in freezers. In his application, prevention of fog forming on the glass panel is the main objective and the heat insulating effect is not a significant factor in the design and production of such a glass panel. Therefore, the design and manufacture of a conventional evacuated glass panel do not satisfy the requirement of high thermally insulating effect.

There is a need in improving the thermally insulating effect of an evacuated glass panel.

SUMMARY OF THE INVENTION

This invention has been made to overcome the above mentioned drawbacks of a conventional thermally insulating evacuated glass panel. It is an object of the present invention to provide an evacuated glass panel containing a thermally insulating vacuum. By having an internal thermally insulating vacuum, the thermal impedance of the evacuated glass panel of the invention is greatly improved.

Another object of the invention is to provide a thermally insulating evacuated glass panel with which users may easily control by themselves the shape or size of the glass panel. In other words, users may trim or cut the evacuated glass panel in any shape or size according to their need after the evacuated glass panel has been manufactured.

Yet another object of the invention is to provide a simple structure of a thermally insulating evacuated glass panel which can be manufactured by an advanced vacuum packaging method. The structure of the thermally insulating evacuated glass panel can be manufactured in a vacuum chamber in a low pressure without special additional equipment. This eliminates the high cost associated with the specialized manufacturing equipment.

The fundamental construction and manufacturing process of a preferred thermally insulating evacuated glazing in accordance with the present invention will be illustrated in the detailed description provided herein below.

The foregoing and other objects, features, aspects and advantages of the present invention will become more apparent from a careful reading of the detailed description, with appropriate reference to the accompanying drawings.

DETAILED DESCRIPTION OF THE PREFERRED EMBODIMENTS

Figure 1:
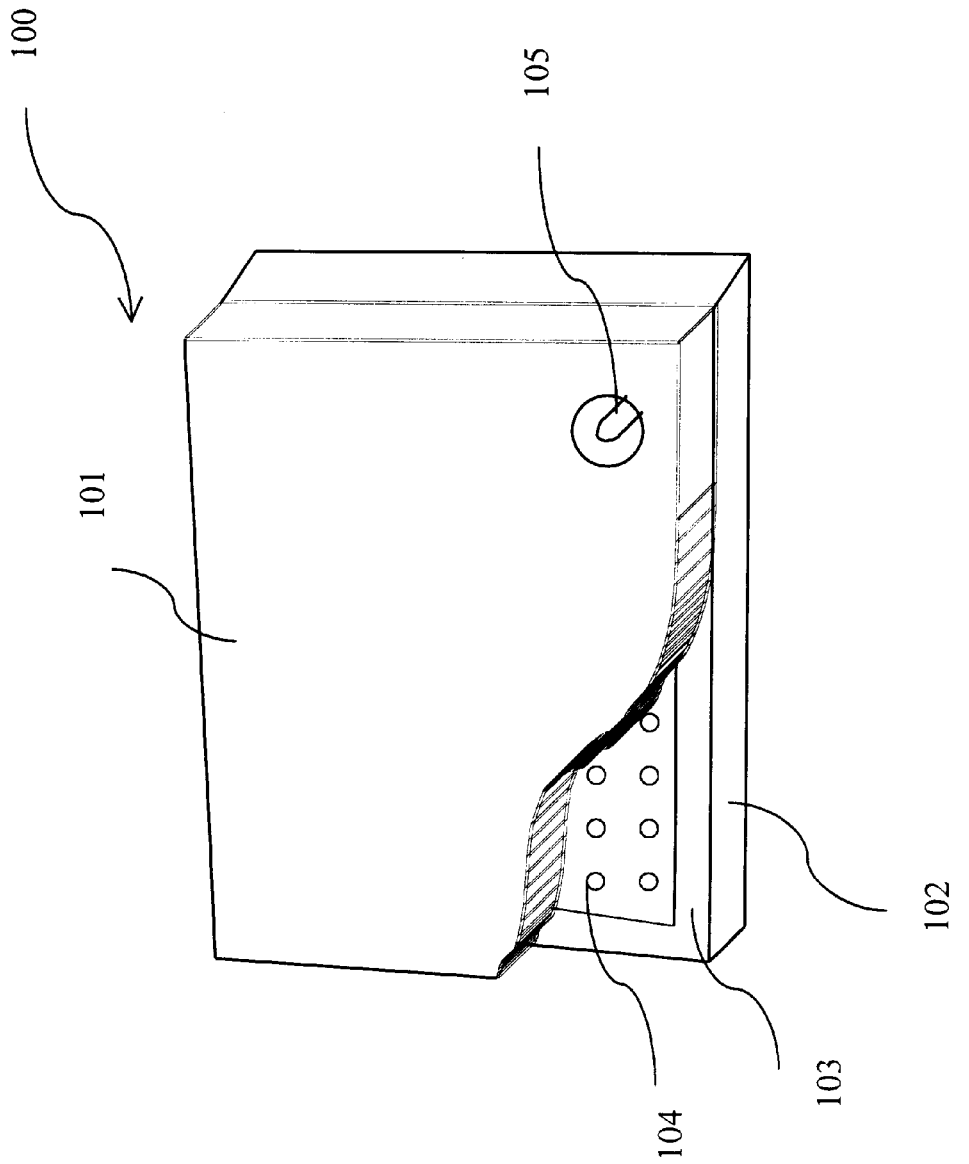
FIG. 1 illustrates a conventional thermally insulating evacuated glazing.
Figure 2:
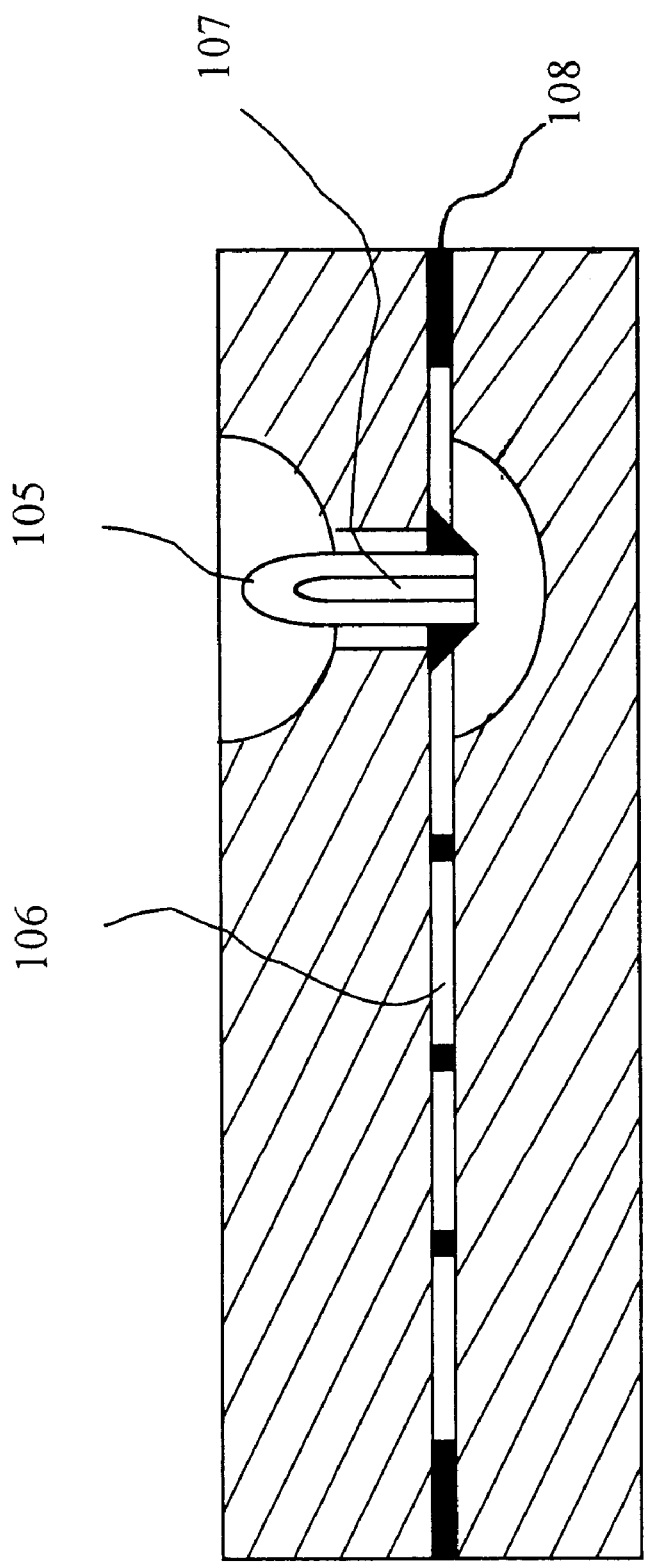
FIG. 2 illustrates a sectional view of the glass panel shown in FIG. 1.
Figure 3:
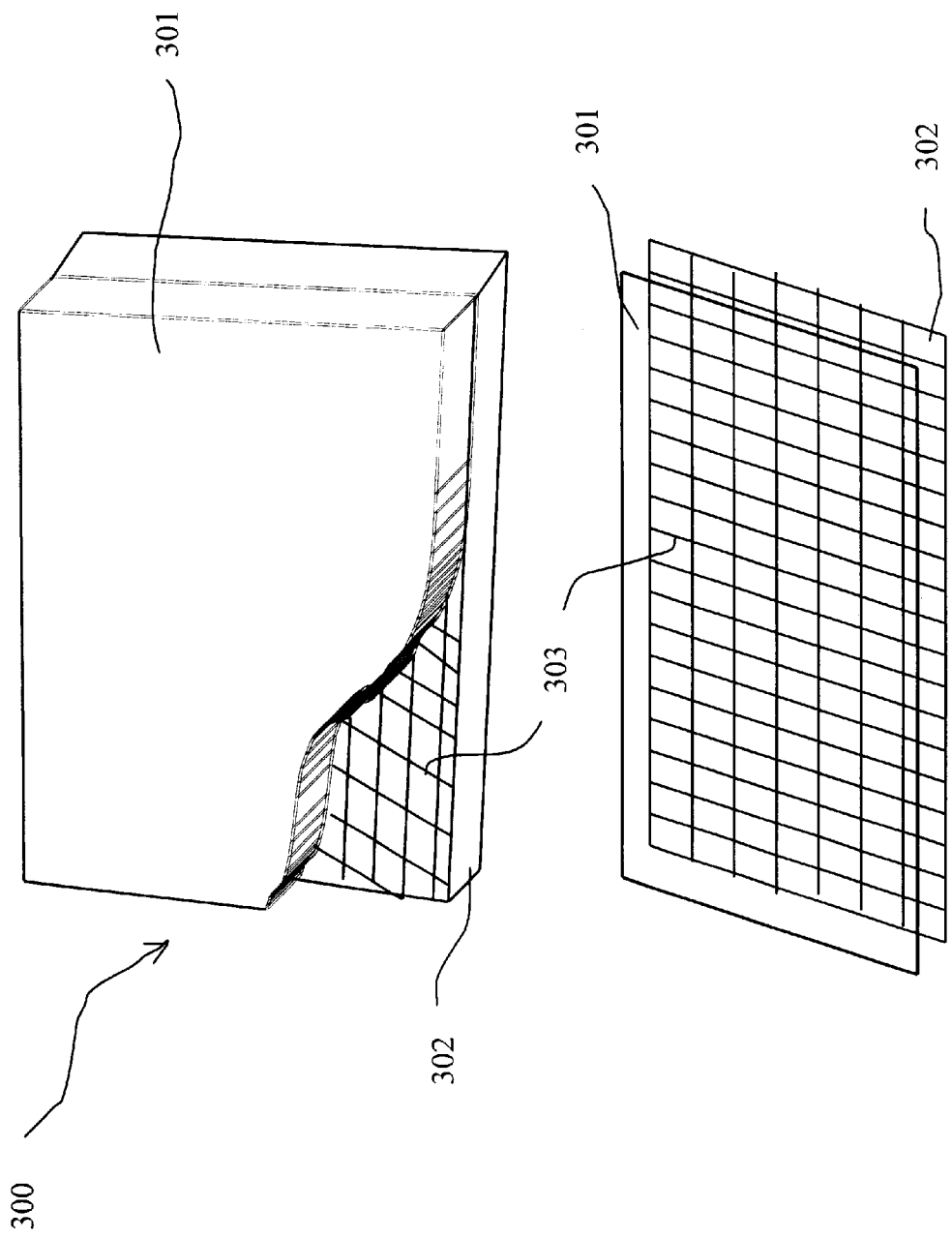
FIG. 3 illustrates the fundamental construction of a preferred thermally insulating evacuated glazing in accordance with the present invention.

FIG. 3 shows the basic construction of a preferred thermally insulating evacuated glass panel 300 according to the present invention. The thermally insulating evacuated glass panel 300 comprises two sheets of glass substrates 301 and 302. Elongate spacers running in two orthogonal directions and forming a mesh-like supporting structure are placed between the glass substrates 301 and 302 to provide a narrow gap. The meshlike supporting structure 303 comprises solder glass (a glass sealing material) that also serves to bond the two glass substrates together.

Figure 4:
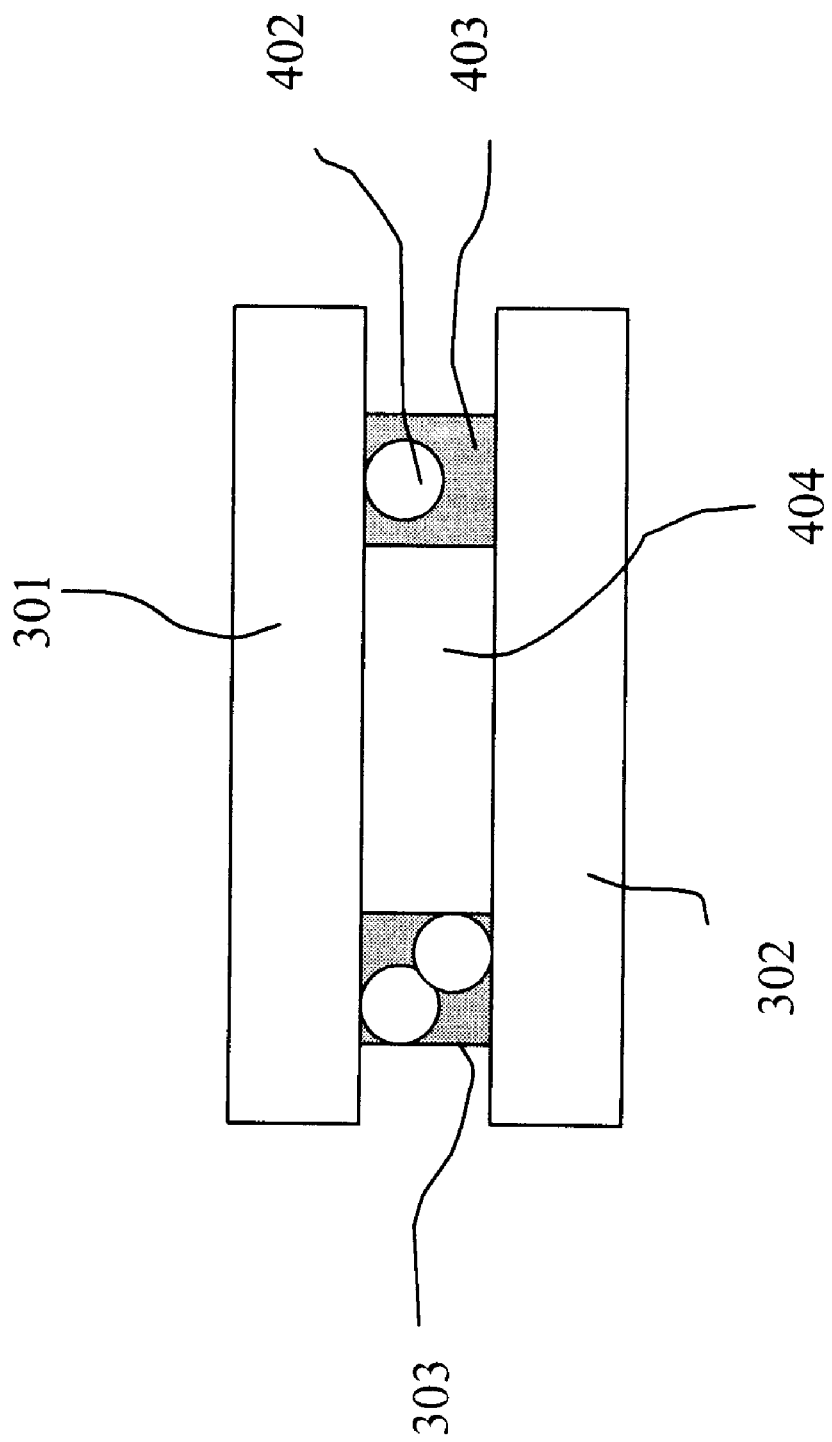
FIG. 4 illustrates a sectional view of FIG. 3.

FIG. 4 shows a cross-sectional view of the preferred embodiment shown in FIG. 3. As shown in FIG. 4, preformed glass spheres 402 are embedded in the mesh-like supporting structure 303. The glass spheres are surrounded with the solder glass 403. The height of the narrow gap 404 between the glass substrates can be controlled by choosing glass spheres of an appropriate size. The glass spheres ensure that the mesh-like supporting structure 303 have enough supporting strength.

According to the present invention, the glass spheres 402 serve to define the distance between the two glass substrates 301 and 302. The preferred distance is in the range from 0.01 mm to 1.0 mm. Glass spheres of these sizes are readily available. Each space formed in a mesh of the mesh-like supporting structure 303 is made a vacuum. The internal pressure in the space is about $10^{-1}$ torr. At low pressures, thermal conduction becomes proportional to the pressure and decreases to zero at zero gas pressure. By having such an internal thermally insulating vacuum, the thermal impedance of the glass panel of the invention is greatly improved The diameter of a glass sphere is typically smaller than 100 $\mu$m. It is preferred that the separation between two glass substrates 301 and 302 be smaller than 5 mm because a large vacuum space may store substantial mechanical energy which could be hazardous if an accidental event occurs. The solder glass used in this invention is also referred as glass frit. Glass frit is a standard adhesive material in the electronics industry and has a thermal expansion coefficient close to that of normal glass.

Therefore, a relatively stress-free joint can be made between the glass flit and a glass substrate.

Solder glass is supplied in the form of fine powder which is mixed with a liquid to form a thick slurry for deposition. It is also available in the form of a flexible glass sheet that may be cut to size and be positioned as desired on the glass substrate. The solder glass is heated and melted before assembling the evacuated glass panel.

Figure 5A:
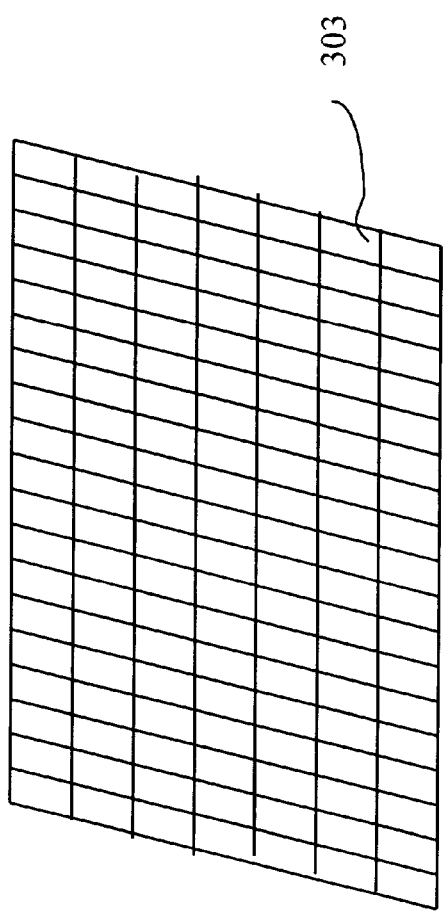
FIGS. 5a–5b illustrate the manufacturing process of the construction shown in FIG. 3.
Figure 5B:
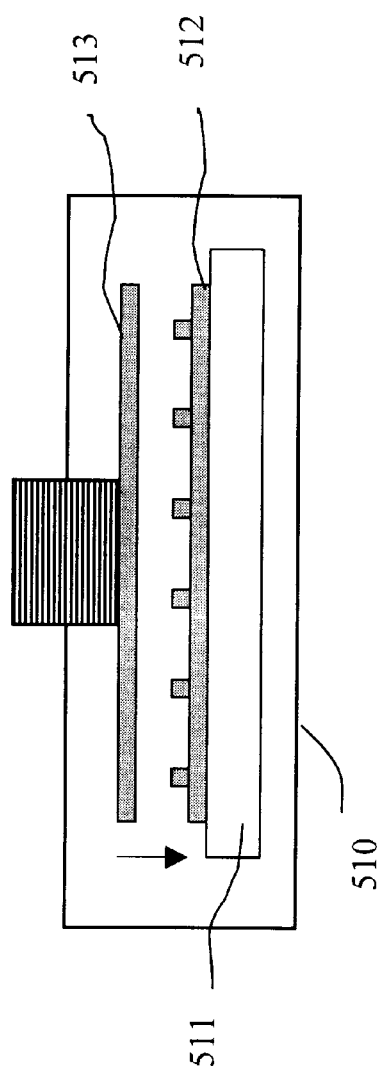

A preferred method for manufacturing a thermally insulating evacuated glass panel embodying the construction of FIG. 4 is now described with reference to FIGS. 5a and 5b. First, a meshlike supporting structure 303 comprising glass spheres embedded in a glass sealing material is deposited on a first glass substrate by means of a mesh printing apparatus or dispensing machine. The mesh-like supporting structure is established in the form of elongated spacers running in two orthogonal directions. The elongated spacers intersect each other and form a two dimensional array pattern as illustrated in FIG. 5a. A second glass substrate is then bonded to the first glass substrate with the mesh-like glass sealing material in between in a vacuum chamber 510 as shown in FIG. 5b.

The glass sealing material 403 comprises a mixture of an organic material or a non-organic material in the form of fine power that is mixed with a liquid to form a slurry for deposition. The glass spheres 402 are mixed in the glass sealing material. Following the deposition, the two glass substrates are placed in an evacuated chamber to be bonded together. The chamber is evacuated to reach a high level of vacuum of approximately $10^{-1}$ torr or less. As shown in FIG. 5b, a heater 511 is provided within the evacuated chamber 510 to heat the glass substrate 512 having the mesh-like supporting structure 303 thereon.

The melting point of glass spheres 402 is higher than that of the glass sealing material 403. The temperature of the evacuated chamber is raised to a working temperature. When the array of meshlike supporting structure 303 is heated and the glass sealing material 403 is completely melted, another glass sheet 513 is moved toward the glass sheet 512. The glass sheet 513 stops moving down when it comes into contact with the glass spheres 402 within the mesh-like supporting structure 303. Very accurate control can be achieved on the separation between the two glass sheets 512 and 513 because it is possible to manufacture glass spheres to quite close tolerance. During the sealing process, the glass sealing material makes a strong bond to both glass sheets 512 and 513.

Following the heating cycle and the sealing operation, the temperature of the evacuated chamber is gradually cooled down. The mesh-like supporting structure is thus very strong and mechanically flaw-free because it consists of freshly solidified glass. The thermally insulating evacuated glass panel according to the invention is then taken out of the evacuated chamber 510.

Accordingly, the thermally insulating evacuated glass panel 300 comprising two glass sheets with a mesh-like supporting structure 303 is assembled and hermetically sealed together. The structure of the thermally insulating evacuated glass panel of the invention is simple enough to be easily manufactured in an evacuated chamber without using special additional equipment. This thus eliminates the high cost associated with purchasing specialized manufacturing equipment.

Because the thermally insulating evacuated glass panel of the invention can be easily trimmed into smaller pieces of any size or shape, it may be used in many areas such as window glass, freezer and so on. As an example, the thermally insulating evacuated glass panel may be used as insulation glass for the windows of a house to reduce the amount of natural resources and electricity power which would otherwise be required to heat or cool the house.

The dimensions of the support structure and the separation of the two glass sheets may control the mechanical and thermal properties of the thermally insulating evacuated glass panel of the invention. In fact, there is an advantage in making the support structure as small as possible in order to reduce heat flow through the glass sealing. The volume of glass spheres may determine the height of the supporting structure. Glass spheres of suitable sizes are readily available. A preferred example of the insulating evacuated glass panel of the invention has glass spheres of roughly 50 um in diameter in the mesh-like supporting structure. The width of each elongated spacer of the supporting structure is about 100 um and the distance between two elongated spacers is approximately 10 mm.

Although this invention has been described with a certain degree of particularity, it should be understood that the present disclosure has been made by way of preferred embodiments only. And, that numerous changes in the detailed construction and combination as well as arrangement of parts may be restored to without departing from the spirit or scope of the invention as hereinafter set forth.

What is claimed is:

1. A thermally insulating evacuated glass panel comprising:

first and second glass substrates; and a supporting structure placed between said first and second glass substrates for maintaining a narrow gap in between, said supporting structure being a plurality of elongated spacers arranged in substantially orthogonal directions for forming a plurality of meshes, and said elongated spacers comprising a plurality of glass spheres mixed in solder glass for controlling the height of said narrow gap;

wherein an evacuated space is enclosed in each mesh by said glass substrates and said supporting structure.

2. The thermally insulating evacuated glass panel according to claim 1, wherein the height of said narrow gap between said first and second glass substrates is smaller than 5 mm.

3. The thermally insulating evacuated glass panel according to claim 1, said elongated spacers each having a width from 1 to 100 um.

4. The thermally insulating evacuated glass panel according to claim 1, said solder glass comprising a sealing material.

5. The thermally insulating evacuated glass panel according to claim 4, said sealing material being an non-organic sealing material.

6. The thermally insulating evacuated glass panel according to claim 4, said sealing material being an organic sealing material.

7. A process for manufacturing a thermally insulating evacuated glass panel, comprising the steps of:
  preparing first and second glass substrates;
  forming a supporting structure on said first glass substrate, said supporting structure being a plurality of elongated spacers arranged in substantially orthogonal directions for forming a plurality of meshes;
  placing said first glass substrate along with said supporting structure and said second glass substrate in a vacuum chamber;
  heating said supporting structure for melting said elongated spacers;
  bonding said first and second glass substrates together by having said melted elongated spacers as a bonding material in between said glass substrates;
  gradually cooling said glass substrates;
  wherein said elongated spacers bond said first and second glass substrates together hermetically, and an evacuated space is enclosed in each mesh by said glass substrates and said supporting structure.

8. The process for manufacturing a thermally insulating evacuated glass panel according to claim 7, wherein the separation between said first and second glass substrates is smaller than 5 mm.

9. The process for manufacturing a thermally insulating evacuated glass panel according to claim 7, said elongated spacers each having a width from 1 to 100 um.

10. The process for manufacturing a thermally insulating evacuated glass panel according to claim 7, said elongated spacers comprising solder glass which comprises a sealing material.

11. The process for manufacturing a thermally insulating evacuated glass panel according to claim 10, said sealing material being an organic sealing material.

12. The process for manufacturing a thermally insulating evacuated glass panel according to claim 10, said sealing material being an non-organic sealing material.

13. The process for manufacturing a thermally insulating evacuated glass panel according to claim 10, said elongated spacers further comprising glass spheres mixed in said solder glass.

* * * * *